(12) United States Patent
Kosaka

(10) Patent No.: US 11,134,171 B1
(45) Date of Patent: Sep. 28, 2021

(54) IMAGE READING APPARATUS, IMAGE FORMING APPARATUS, AND IMAGE READING METHOD THAT PERFORM IMAGE PROCESSING FOR EACH AREA

(71) Applicant: KYOCERA Document Solutions Inc., Osaka (JP)

(72) Inventor: Naohiko Kosaka, Dublin, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/917,639

(22) Filed: Jun. 30, 2020

(51) Int. Cl.
*H04N 1/40* (2006.01)
*H04N 1/04* (2006.01)
*H04N 1/00* (2006.01)
*G06K 9/00* (2006.01)

(52) U.S. Cl.
CPC ..... *H04N 1/40062* (2013.01); *G06K 9/00456* (2013.01); *H04N 1/00251* (2013.01); *H04N 1/04* (2013.01); *H04N 2201/0094* (2013.01)

(58) Field of Classification Search
CPC ........... H04N 1/40062; H04N 1/00251; H04N 2201/0094; H04N 1/00846; H04N 1/00867; H04N 1/00883; H04N 1/32203; H04N 1/32229; H04N 1/3871; H04N 2201/3269; H04N 2201/327; H04N 2201/3271; H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–1/207; H04N 2201/04–207; G06K 9/00456; G03G 15/5029; G03G 2215/00751; G06T 2207/10008; G06T 2207/10024; G06T 7/11; G06T 7/187
USPC ......................................................... 358/1.1
See application file for complete search history.

(56) References Cited

U.S. PATENT DOCUMENTS

| 4,937,676 A * | 6/1990 | Finelli .................. H04N 1/2112 348/360 |
| 5,907,835 A | 5/1999 | Yokomizo et al. |
| 6,628,333 B1 * | 9/2003 | Gowda ................ H04N 1/0044 348/207.2 |

(Continued)

FOREIGN PATENT DOCUMENTS

| JP | 2008-061170 A | 3/2008 |
| JP | 2012-118863 A | 6/2012 |

*Primary Examiner* — Negussie Worku
(74) *Attorney, Agent, or Firm* — Hawaii Patent Sendees; Nathaniel K. Fedde; Kenton N. Fedde

(57) ABSTRACT

Provided is an image reading apparatus capable of improving the image quality of a document in which texts and images are appeared in the same page. The camera captures a document in page units to obtain captured image data. An area classifying unit classifies the captured image data into areas for each content. An area selecting unit selects whether or not to output the captured image data based on the classification of the area and state of the captured image data. An image scanner scans the area of the document for the area selected not to output the captured image data. An image processing unit processes the captured image data or scanned image data for each area and outputs or deletes it as area data. A document output unit collects the processed area data, reconstructs the data into document data, and outputs it.

15 Claims, 7 Drawing Sheets

(56) References Cited

U.S. PATENT DOCUMENTS

| | | | |
|---|---|---|---|
| 6,753,976 B1 | 6/2004 | Torpey et al. | |
| 7,536,026 B2 | 5/2009 | Kaneda et al. | |
| 8,726,178 B2 | 5/2014 | Matulic | |
| 9,497,255 B2* | 11/2016 | Kirsch | H04L 29/06 |
| 9,729,755 B2* | 8/2017 | Stuart | H04N 1/0044 |
| 10,416,433 B2* | 9/2019 | Matsumoto | C12M 41/46 |
| 2006/0218115 A1* | 9/2006 | Goodman | G06F 40/20 |
| 2007/0036468 A1* | 2/2007 | Matsushita | G06F 16/93 |
| | | | 382/305 |
| 2007/0127771 A1* | 6/2007 | Kaneda | H04N 1/32299 |
| | | | 382/100 |
| 2007/0133074 A1* | 6/2007 | Fabrice | G06T 11/60 |
| | | | 358/537 |
| 2010/0303360 A1* | 12/2010 | Matsuda | H04N 1/3871 |
| | | | 382/195 |
| 2011/0299794 A1* | 12/2011 | Noguchi | H04N 1/00867 |
| | | | 382/284 |
| 2012/0321187 A1* | 12/2012 | Yamaji | H04N 1/00461 |
| | | | 382/173 |
| 2013/0044962 A1* | 2/2013 | Kim | G06F 16/58 |
| | | | 382/254 |
| 2016/0155229 A1* | 6/2016 | Shinoda | G16H 30/20 |
| | | | 382/131 |

\* cited by examiner

Lorem Ipsum

Lorem ipsum dolor sit amet, ea eum idque referrentur. Purto voluptatibus in has. Sint quodsi mei ut. Tale tincidunt id mei, menandri explicari in quo, ut est invidunt iracundia comprehensam. Indoctum ullamcorper no mel.

Ut nisl magna oratio vis. Brute malorum postulant quo ut, nec verear posidonium cu. Noluisse assentior cotidieque ut cum. Mel id causae tamquam, esse theophrastus per At ipsum. Ligula ut Advertisement. We provide all type of cleaning. Call 1800-111-1111.

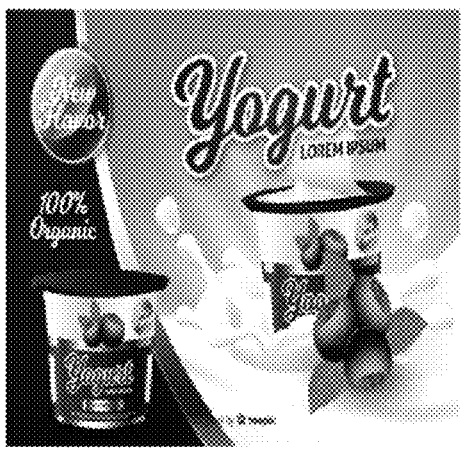

Page 1

FIG.5

IMAGE READING APPARATUS, IMAGE FORMING APPARATUS, AND IMAGE READING METHOD THAT PERFORM IMAGE PROCESSING FOR EACH AREA

BACKGROUND

The present disclosure relates to an image reading apparatus, an image forming apparatus, and an image reading method, and particularly to an image reading apparatus, an image forming apparatus, and an image reading method that perform image processing for each area.

Typically, there is an image forming apparatus such as a multifunctional peripheral (MFP) capable of printing a document or an image. The image forming apparatus is also used as an image reading apparatus, which is mainly used for scanning. Moreover, there are also a dedicated reading apparatus such as a document scanner and a network scanner.

A typical image reading apparatus is disclosed. The typical apparatus is an image scanner system and an image scanner apparatus capable of correcting the brightness of a captured image without using an initial setting sheet. In this apparatus, a display section is provided on a mat section, a rectangular section of the display section is displayed in white, an image is taken by a camera section, and a brightness correction parameter is calculated for the obtained image by a host apparatus. The correction parameters obtained by calculation are used to correct the brightness of an image obtained by imaging the imaging target during operation.

SUMMARY

An image reading apparatus according to the present disclosure includes a camera configured to capture a document in page units and acquire captured image data; an area classifying unit configured to classify the captured image data captured by the camera into areas for each content; an area selecting unit configured to select, for each area classified by the area classifying unit, whether or not to output the captured image data based on classification and state of the captured image data; an image scanner configured to have a higher resolution than the camera that scans the area of the document for the area selected not to output the captured image data in the area selecting unit; an image processing unit configured to process, for each area, the captured image data or scan image data scanned by the image scanner and output the area as an area data or delete the area; and a document output unit configured to collect the area data processed by the image processing unit, reconstruct the data into document data, and output the document data.

An image forming apparatus according to the present disclosure includes: a camera configured to capture a document in page units and acquire captured image data; an area classifying unit configured to classify the captured image data captured by the camera into areas for each content; an area selecting unit configured to select, for each area classified by the area classifying unit, whether or not to output the captured image data based on classification and state of the captured image data; an image scanner configured to have a higher resolution than the camera that scans the area of the document for the area selected not to output the captured image data in the area selecting unit; an image processing unit configured to process, for each area, the captured image data or scan image data scanned by the image scanner and output the area as an area data or delete the area; a document output unit configured to collect the area data processed by the image processing unit, reconstruct the data into document data, and output the document data; and an image forming unit configured to form an image of the document data output by the document output unit.

An image reading method according to the present disclosure executed by an image reading apparatus, includes the steps of: with a camera, capturing a document in page units and acquires captured image data; classifying the captured image data that is obtained into areas for each content; selecting, for each classified area, whether or not to output the captured image data based on classification and state of the captured image data; with an image scanner having a higher resolution than the camera, scanning the area of the document for the area selected not to output the captured image data; processing, for each area, the captured image data or scan image data scanned by the image scanner and outputting the area as an area data or deletes the area; and collecting processed area data, reconstructing the data into document data, and outputting the document data.

BRIEF DESCRIPTION OF THE FIGURE

FIG. 5 is a diagram illustrating an example of captured image data obtained by the camera imaging process as shown in FIG. 4;

DETAILED DESCRIPTION

Embodiment

[Configuration of Image Forming Apparatus 1]

Figure 1:
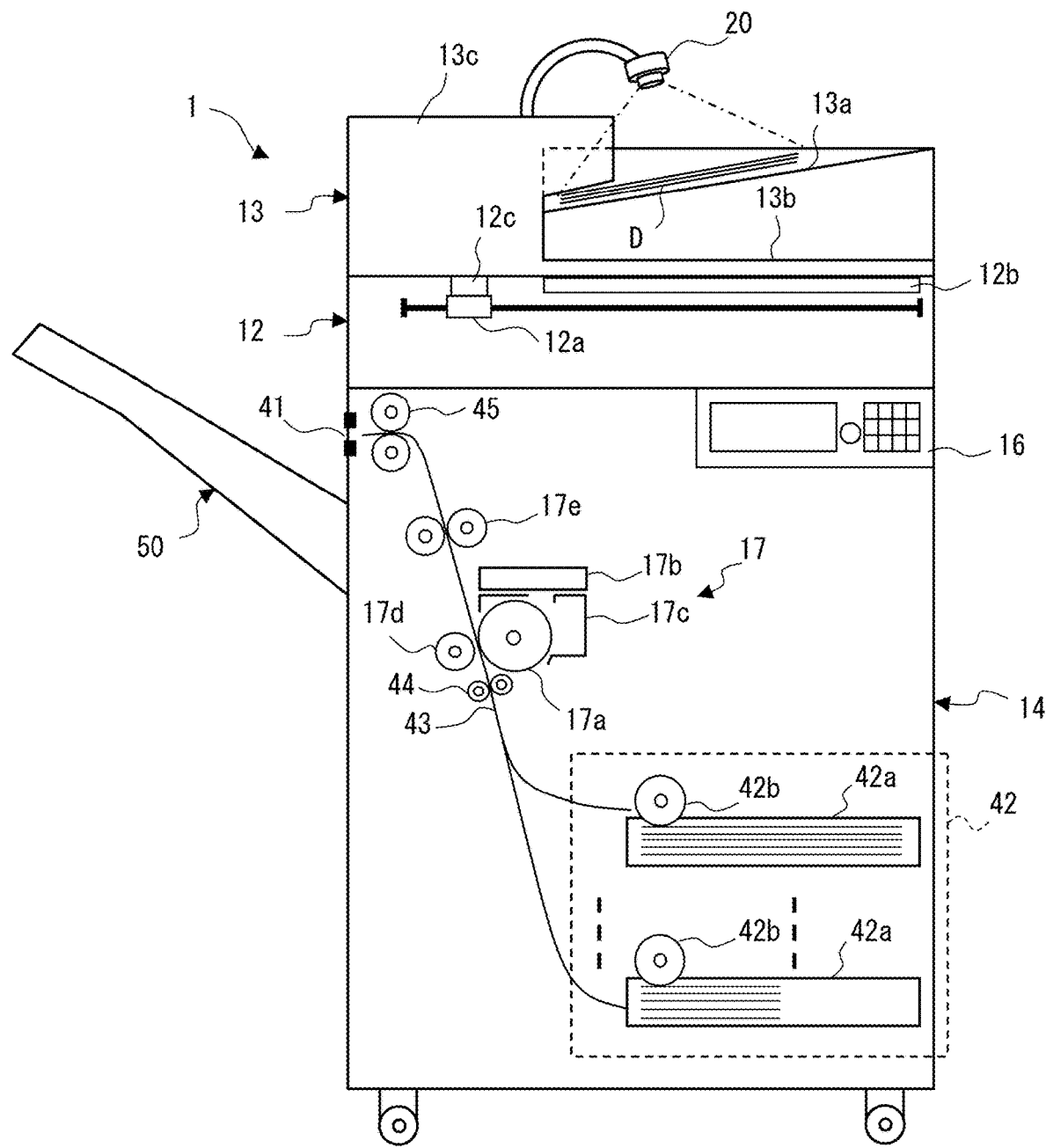
FIG. 1 is a schematic diagram of an image forming apparatus according to an embodiment of the present disclosure.
Figure 2:
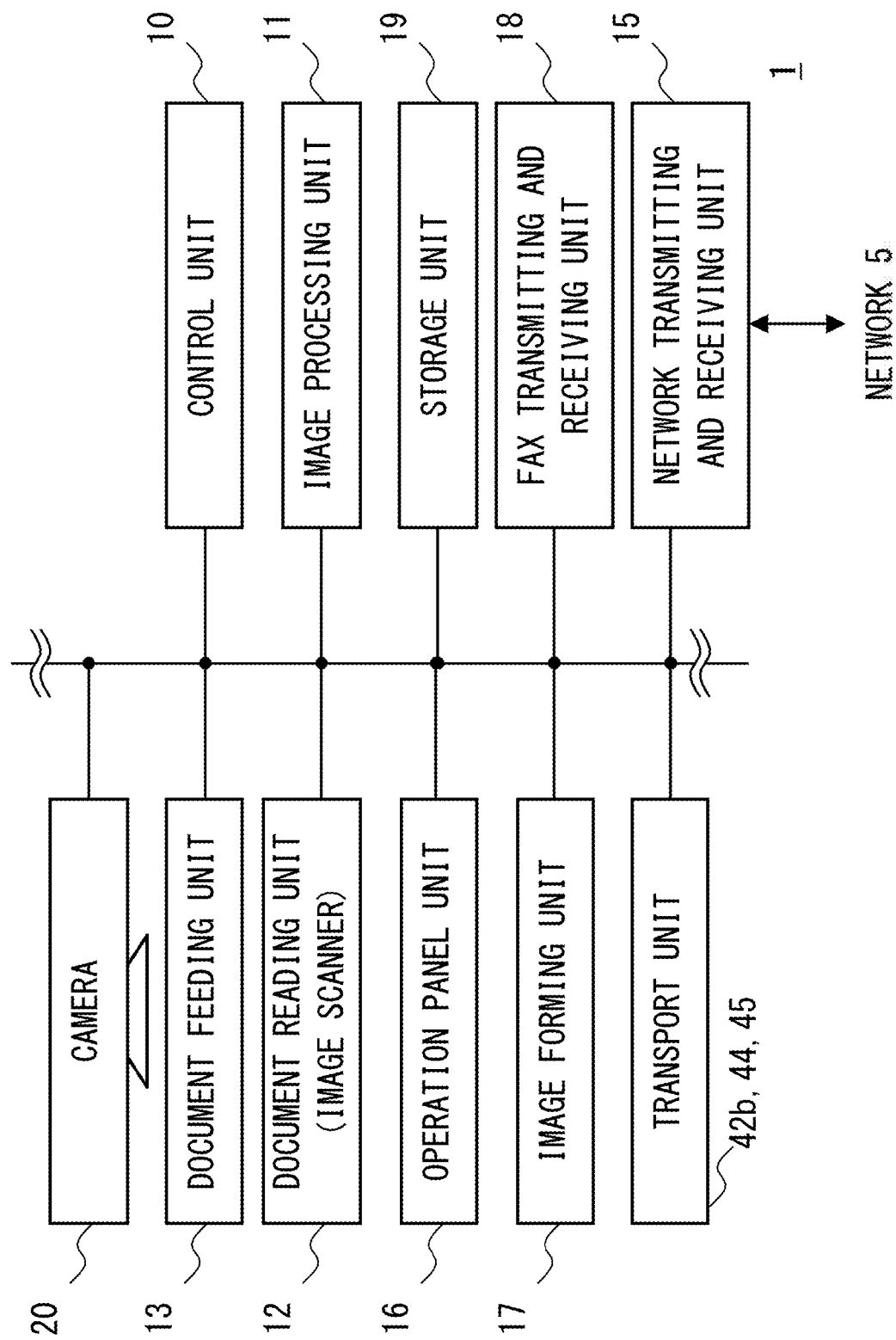
FIG. 2 is a block diagram showing a control configuration of the image forming apparatus as shown in FIG. 1.

Next, with reference to FIGS. 1-2, an embodiment of an implementation of the image forming apparatus 1 is described in detail configuration.

First, the appearance and operation of the image forming apparatus 1 is described with reference to FIG. 1. The image forming apparatus 1 is an example of the image reading apparatus according to the present embodiment.

In the image forming apparatus 1, the document reading unit 12 is provided above the main body 14, and the document feeding unit 13 is provided above the document reading unit 12. The stack tray 50 is provided on the recording paper discharge port 41 side formed in the main body 14. The operation panel unit 16 is provided on the front side of the image forming apparatus 1.

The document reading unit 12 is an image scanner including a scanner 12a, a platen glass 12b, and a document reading slit 12c. The scanner 12a includes an exposure lamp, a charge coupled device (CCD) or a complementary metal oxide semiconductor (CMOS) image sensor, and the like.

The document reading unit 12 is configured to be movable in a document conveying direction by the document feeding unit 13.

The platen glass 12b is a platen made of a transparent member such as glass. The document reading slit 12c has a slit formed in a direction perpendicular to the direction in which the document is transported by the document feeding unit 13.

Figure 3:
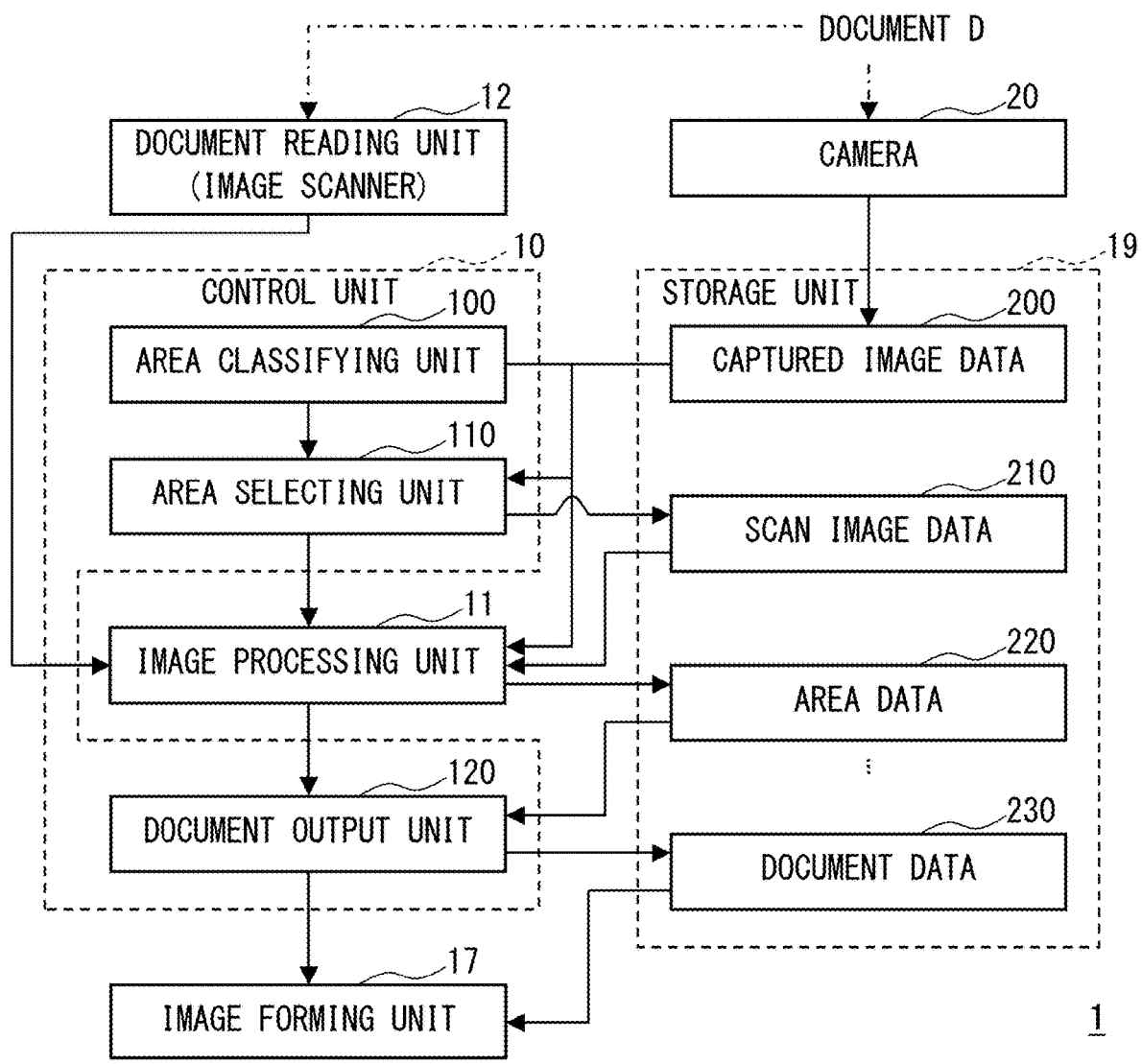
FIG. 3 is a block diagram showing a functional configuration of the image forming apparatus as shown in FIG. 1.

When reading a document placed on the platen glass 12b, the scanner 12a is moved to a position facing the platen glass 12b. Then, the scanner 12a reads the document while scanning the document placed on the platen glass 12b, and acquires the scan image data 210 (FIG. 3). The scanner 12a stores the acquired scanned image data 210 in the storage unit 19 (FIG. 2) of the main body 14.

When reading a document conveyed by the document feeding unit 13, the scanner 12a is moved to a position facing the document reading slit 12c. Then, the scanner 12a reads the document via the document reading slit 12c in synchronization with the document feeding operation by the document feeding unit 13 and acquires the scan image data 210. The scanner 12a stores the acquired scanned image data 210 in the storage unit 19 of the main body 14.

Here, in the present embodiment, the document reading unit 12 can scan at an arbitrary rectangular position on the paper surface of the document D in color, partial color, monochrome, or the like, by setting the reading resolution.

The document feeding unit 13 includes a document placing section 13a, a document discharge section 13b, and a document transport mechanism 13c. The document D, which is placed on the document placing section 13a, is sequentially fed out one by one from the upper surface by the document transporting mechanism. 13c, is transported to a position facing the document reading slit 12c, and is then discharged to the document discharge section 13b.

The document feeding unit 13 is configured to be foldable, and the upper surface of the platen glass 12b can be opened by lifting the document feeding unit 13 upward.

The camera 20, which is described later, can also capture the document D in this state.

The main body 14 includes the image forming unit 17, and also includes a paper feed unit 42, a paper transport path 43, a transport roller 44, and a discharge roller 45. The paper feed unit 42 includes a plurality of paper feed cassettes 42a that store recording papers having different sizes or directions, and a paper feed roller 42b that feeds the recording paper from the paper feed cassette 42a one by one to a paper transport path 43. The paper feed roller 42b, the transport roller 44, and the discharge roller 45 function as a transport unit. The recording paper is transported by this transport unit.

The recording paper fed to the paper transport path 43 by the paper feed roller 42b is transported to the image forming unit 17 by the transport roller 44. Then, the recording paper on which the recording is performed by the image forming unit 17 is discharged to the stack tray 50 by the discharge roller 45. In addition, the main body 14 may include an internal tray in addition to the stack tray 50.

The operation panel unit 16 includes an input unit such as a button and a touch panel, and a display unit such as an LCD (Liquid Crystal Display) and an organic EL (OEL or OLED) display. The buttons of the input unit of the operation panel unit 16 are numeric pads, buttons for starting, canceling, switching operation modes, and giving instructions for executing a job. Among these, the switchable operation modes include, for example, modes such as copying, facsimile transmission, scanner, network scanner, or the like. Executable jobs include, for example, printing, transmitting, saving, recording the selected document, or the like.

The operation panel unit 16 is provided on the front side of the image forming apparatus 1. The input unit of the operation panel unit 16 acquires instructions of various jobs of the image forming apparatus 1 by the user. In addition, it is also possible to input and change information of each user according to the user's instruction acquired from the operation panel unit 16.

The image forming unit 17 includes a photosensitive drum 17a, an exposure unit 17b, a developing unit 17c, a transfer unit 17d, and a fixing unit 17e. The exposure unit 17b is an optical unit including a laser device, a mirror, a lens, an LED (light-emitting diode) array, and the like. The exposure unit 17b emits light based on bitmap data, or the like, on which the document data 230 (FIG. 3) is image-formed and exposes the photosensitive drum 17a to form an electrostatic latent image on the surface of the photosensitive drum 17a. The developing unit 17c is a developing unit that develops an electrostatic latent image formed on the photosensitive drum 17a by using toner, and forms a toner image based on the electrostatic latent image on the photosensitive drum 17a. The transfer unit 17d transfers the toner image formed on the photosensitive drum 17a by the developing unit 17c to a recording paper. The fixing unit 17e heats the recording paper onto which the toner image has been transferred by the transfer unit 17d and fixes the toner image on the recording paper. In this heating, it is possible to use IH (Induction Heating), or the like.

The camera 20 is a camera provided with an image sensor such as a CCD or a CMOS image sensor, an optical element such as a lens, an LED illumination, and the like, which can image a document D placed on the document feeding unit 13. The camera captures an image of the document D in page units. Specifically, the camera 20 captures a still image or a moving image of the entire surface (page) of the document D one by one and outputs the captured image data 200 (FIG. 3), which is captured, to the storage unit 19 in the main body 14. The resolution of the captured image data 200 may be lower than that of the scan image data 210 (FIG. 3) acquired by the document reading unit 12. Note that the camera 20 may be provided with a mechanism such as a zoom and a tilt so that an arbitrary position of the document can be magnified and captured.

Next, a control configuration of the image forming apparatus 1 is described with reference to FIG. 2. Description of the configuration described in FIG. 1 is partially omitted.

The image forming apparatus 1 includes a control unit 10, an image processing unit 11, a document reading unit 12, a document feeding unit 13, a network transmitting and receiving unit 15, an operation panel unit 16, an image forming unit 17 (image forming unit), a fax transmitting and receiving unit 18, a storage unit 19, a transport unit, or the like.

Each unit is connected to the control unit 10 and its operation is controlled by the control unit 10.

The control unit 10 is information processing unit, such as GPP (General Purpose Processor), CPU (Central Processing Unit), MPU (Micro Processing Unit), DSP (Digital Signal Processor), GPU (Graphics Processing Unit), ASIC (Application Specific Integrated Circuit), or the like.

The control unit 10 reads a control program stored in the ROM or the HDD of the storage unit 19, expands the control program in the RAM, and executes the control program to operate as each unit of a function block as described later. Further, the control unit 10 controls the entire apparatus according to prescribed instruction information inputted from an external terminal or the operation panel unit 16.

The image processing unit 11 is a control arithmetic unit such as a DSP (Digital Signal Processor), a GPU (Graphics Processing Unit), an ASIC, and the like. The image processing unit 11 performs some image processing on image data. The image processing may be, for example, processing such as enlargement/reduction, rotation and distortion (skew) correction, density adjustment, gradation adjustment, and image improvement. The skew correction includes processing of a spread portion of a spread document such as a book, and the like. In addition, the image processing unit 11 may be capable of executing a process such as averaging, or the like, the captured image data 200 as the moving image data to increase the resolution or remove noise.

Further, in the present embodiment, the image processing unit 11 can perform analysis and recognition process on an image. The image processing unit 11 can also recognize, for example, whether an image is color, partial color, or monochrome, and can also acquire the ground color.

In addition, the image processing unit 11 may include an accelerator function of an AI (Artificial Intelligence) including a convolutional neural network (Convolutional Neural Network), another artificial neural network, reinforcement learning, and the like. In this case, the image processing unit 11 can use a learned model or perform model learning. In the present embodiment, it is possible to use various models for recognizing a document area and recognizing characters, tables, and images. Among these, for the image, a model that recognizes a non-text line, a symbol, an illustration, a logo, a photograph, or the like, can be used. For a photograph, a model that recognizes an imaged object such as a person, an animal, a material body, or the like, can also be used. Furthermore, it is also possible to use a model that recognizes an advertisement by combining these various models.

In the present embodiment, the image processing unit 11 can execute an OCR (Optical Character Recognition) process. The image processing unit 11 can also perform the OCR using various types of image recognition algorithm and AI. The image processing unit 11 can also detect the location of the form in the table by the OCR. For the location of the form, it is possible to use the above-described model for recognizing non-text lines. Furthermore, the image processing unit 11 may be able to determine the content of the text by using the AI of the natural language processing. In this case, analysis by using a distributed word expression, semantic analysis of text, similarity search, and the like, can be performed. In addition, the AI of the natural language processing can be added to the above-described advertisement recognition model. In the model for recognizing the advertisement, if a trademark, a logo, a specific phrase, a currency symbol, an address, a telephone number, and the like, are included, the advertisement can be determined.

Further, the image processing unit 11 can store the scan image data 210 (FIG. 3) read by the document reading unit 12 and the captured image data 200 captured by the camera 20 in the storage unit 19 as print data. In this case, the image processing unit 11 may include an accelerator function for converting the print data into electronic document data or image data.

The network transmitting and receiving unit 15 is a network connection unit including a LAN board for connecting to an external network, a wireless transceiver, and the like. The external network according to the present embodiment is, for example, a LAN, a wireless LAN, a WAN, a mobile telephone network, a voice telephone network, or the like.

The network transmitting and receiving unit 15 transmits and receives data on a data communication line, and transmits and receives a voice signal on a voice telephone line.

The fax transmitting and receiving unit 18 performs transmitting and receiving facsimile. The fax transmitting and receiving unit 18 receives a facsimile from another facsimile device via a voice line and stores it in the storage unit 19. The facsimile transmitting and receiving unit 18 can cause the image forming unit 17 to form it an image. Further, the fax transmitting and receiving unit 18 can convert the document read by the document reading unit 12 or the data of the network facsimile transmitted from an external terminal into image data, and facsimile-transmit the image data to another facsimile device via a voice line.

The storage unit 19 is a non-temporary recording medium such as a semiconductor memory as a ROM (Read Only Memory) and a RAM (Random Access Memory), or the like, and as an HDD (Hard Disk Drive).

In the present embodiment, the storage unit 19 stores various image data, document data 230 (FIG. 3), and the like.

The contents in the RAM of the storage unit 19 are retained by a function such as self-refresh even in the power saving state.

A control program for controlling the operation of the image forming apparatus 1 is stored in the ROM or the HDD of the storage unit 19. In addition, the storage unit 19 also stores user account settings. Further, the storage unit 19 may include a storage folder (document box) area for each user.

In addition, in the image forming apparatus 1, the control unit 10 and the image processing unit 11 may be integrally formed, such as a CPU with a built-in GPU, a chip-on-module package, an SOC (System On a Chip), and the like.

Further, the control unit 10 and the image processing unit 11 may include a RAM, a ROM, a flash memory, or the like. Furthermore, the control unit 10 can perform at least a part of the image processing of the image processing unit 11.

[Functional Configuration of Image Forming Apparatus 1]

Here, a functional configuration of the image forming apparatus 1 is described with reference to FIG. 3.

The control unit 10 of the image forming apparatus 1 includes an area classifying unit 100, an area selecting unit 110, and a document output unit 120.

The storage unit 19 stores captured image data 200, scan image data 210, area data 220, and document data 230.

The area classifying unit 100 classifies the captured image data 200 captured by the camera 20 into areas for each content. In the present embodiment, the area classifying unit 100 can recognize an area from each page of the document D using AI or the like, and classify each area as one of a text, a table, an image, and the like. At this time, the area classifying unit 100 can also determine information such as the accuracy of the classification and the state of the area. In addition, the area classifying unit 100 can perform high-speed processing by using the AI accelerator, or the like, of the image processing unit 11 at the time of classification.

The area selecting unit 110 selects, for each area classified by the area classifying unit 100, whether or not to output the captured image data 200 based on the classification of the area and the state of the captured image data 200.

Specifically, in the present embodiment, the area selecting unit 110 does not output the captured image data 200 when the area is classified as a text or a table and the state of the captured image data 200 is not suitable for performing OCR, and the document is scanned by the document reading unit 12.

The document output unit 120 collects the area data 220 processed by the image processing unit 11, reconstructs the area data 220, and outputs the document data 230. At this time, the document output unit 120 does not have to collect the area data 220, which is performed deletion process by the image processing unit 11.

In the present embodiment, the image processing unit 11 processes the selected captured image data 200 or scan image data 210 for each area, and outputs or deletes it as area data 220.

Specifically, in the present embodiment, the image processing unit 11 recognizes an image that is not related to the content of the text and performs the deletion process. The images that is not related to the content of the text includes an advertisement, an illustration, a logo, and the like.

In the present embodiment, the document reading unit 12 scans the area of the document D for the area selected by the area selecting unit 110 not to output the captured image data 200. For this reason, in the present embodiment, the document reading unit 12 functions as an image scanner having a higher resolution than the camera 20.

In the present embodiment, the camera 20 captures an image of a document in page units and acquires captured image data 200.

The captured image data 200 is image data captured by the camera 20 from the document D in page units. As this image data, it is possible to use image data of various still images such as JPEG (JPG), TIFF, RAW, raw bitmap, BMP, GIF, PNG, and the like. Alternatively, the captured image data 200 may be image data of a still image, which a frame is extracted from image data of a moving image or image quality is improved by averaging, or the like.

The scan image data 210 is image data scanned by the document reading unit 12. This image data may have higher resolution than the captured image data 200, more color information, less reflection of lighting, and may be suitable for OCR. That is, when OCR is performed by using the scan image data 210, it may be possible to reduce erroneous recognition.

The area data 220 is image data for each area classified by the area classifying unit 100 in each page of the document D. In the present embodiment, the area data 220 is data that includes only a portion of processed area derived from the captured image data 200 or the scan image data 210. The area data 220 may include text data after OCR, table structure data, image data subjected to high image quality processing, and the like. Alternatively, when the deletion processing has been performed, the area data 220 may be data in a state in which a blank or a "NULL" value is written.

The document data 230 is electronic document data such as PDF (Portable Document Format), PS (Post Script), XML (Extensible Markup Language), a word processor file, a spreadsheet file, a presentation software file, and the like. Document data 230 may include text data, image data, and other binary data. Of these, the text data may include structured data described in a markup language such as XML, or the like. This structured data includes information on forms and tables, information on the above-described areas, page information, printing properties, other meta information, and the like. The image data may be a type of data included in the electronic document data 230 such as JPEG, TIFF, GIF, PNG, and the like.

Here, the control unit 10 of the image forming apparatus 1 executes the control program stored in the storage unit 19 to function as the area classifying unit 100, the area selecting unit 110, and the document output unit 120.

Further, each unit of the above-described image forming apparatus 1 is a hardware resource for executing the image forming method of the present disclosure.

Note that a part or an arbitrary combination of the above-described functional configurations may be configured in terms of hardware and circuits by using an IC, a programmable logic, an FPGA (Field-Programmable Gate Array), or the like.

[Document Reading Process by Image Forming Apparatus 1]

Next, with reference to FIGS. 4 to 7, a document reading process by the image forming apparatus 1 according to the embodiment of the present disclosure is described.

In the document reading process according to the present embodiment, the image of the document D is captured by the camera 20 in page units, and captured image data 200 is acquired. Then, the captured image data 200 is classified into areas for each content. For each classified area, whether or not to output the captured image data 200 is selected based on the classification and the state of the captured image data 200. Here, the document reading unit 12 scans the area of the document D for the area selected not to output the captured image data 200. Then, for each area, the captured image data 200 or the scanned image data 210 is processed and output as area data 220 or deleted. Then, the processed area data 220 is collected, reconstructed into document data 230, and output it.

In the document reading process according to the present embodiment, the control unit 10 mainly executes a program stored in the storage unit 19 by using hardware resources in cooperation with each unit.

Figure 4:
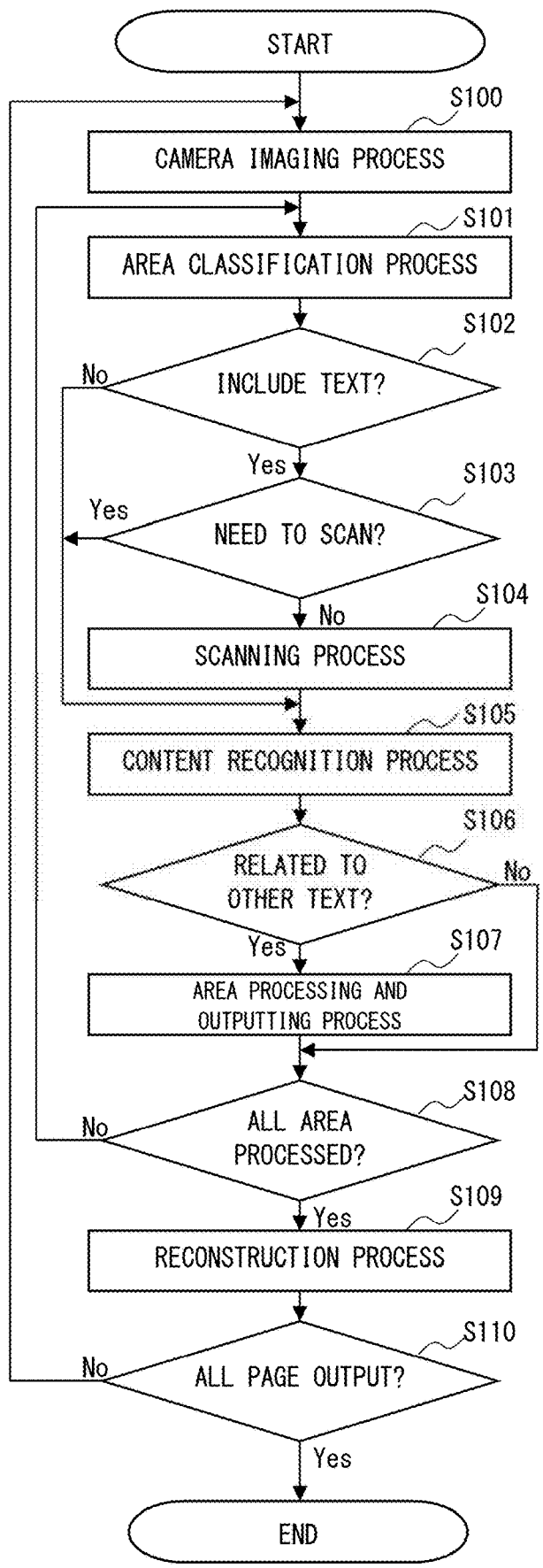
FIG. 4 is a flowchart of a document reading process according to the embodiment of the present disclosure.

Hereinafter, the details of the document reading process according to the present embodiment is described step by step with reference to the flowchart in FIG. 4.

(Step S100)

First, the area classifying unit 100 and the camera 20 perform camera imaging process.

Here, the user places the document D on the document placing section 13*a* of the document feeding unit 13 and gives an instruction to read the document on the operation panel unit 16. At this time, the user can set the format of the document data 230 created after reading, the necessity of an image in the document, and the like. The format of the document data 230 includes a file format, color, partial color, or black and white settings, resolution settings, print and transmission settings, and the like. Further, as the format of the document data 230, it is also possible to set whether or not to delete a handwritten comment, a figure, a highlighted marker, or the like.

Furthermore, the user can issue various output instructions such as transmitting by designating the location of the read document data 230, storing in a document box, printing of a document in the image forming unit 17, and the like.

The area classifying unit 100 that has received these instructions transmits a command for capturing the document D to the camera 20.

Then, the camera 20 captures the document D in page units, acquires captured image data 200, and stores the captured image data 200 in the storage unit 19. At this time, the image processing unit 11 can also temporarily process the entire captured image data 200 to improve image quality.

The imaged document D is sequentially fed out one by one from the upper surface by the document transport mechanism 13*c* and discharged to the document discharge unit 13*b*. At this time, the document D may be scanned as described later.

FIG. 5 shows an example of the captured image data 200.

(Step S101)

Here, the area classifying unit 100 performs an area classification process.

The area classifying unit 100 classifies the captured image data 200 captured by the camera 20 into areas for each content. In the present embodiment, first, the area classifying unit 100 performs a geometric layout analysis by using, for example, various models, or the like, of the AI in the image processing unit 11.

Specifically, for example, the area classifying unit 100 acquires a ground color, recognizes a page margin of the captured image data 200, and recognizes a page number and an index by using the image processing unit 11. Then, the area classifying unit 100 recognizes a unit of characters and images of the captured image data 200 as an area from major parts other than these. The area classifying unit 100 can recognize the area based on a blank, an outline, and geometric information.

Then, the area classifying unit 100 classifies the content of the recognized area. Specifically, the area classifying unit 100 classifies the area into one of a text, a table, and an image, and performs labeling. At this time, the area classifying unit 100 analyzes the accuracy of the classification, the state of the area, and the like, and performs labeling. The area classifying unit 100 can recognize whether the state of the area is color, partial color, or monochrome (black and white). Further, the area classifying unit 100 can recognize the presence or absence of a stain, a portion of poor printing state, or a blurred or unclear spot (hereinafter, simply referred to as "stain, or the like") as the state of the area. Further, in the case of a text or a table, the area classifying unit 100 can analyze whether or not OCR is possible based on the stain, or the like. Specifically, when the stain or the like is equal to or more than a specific stain threshold, the area classifying unit 100 analyzes that the OCR is not possible because the false recognition rate is too high in the OCR.

The area classifying unit 100 stores the data of the labeling of the analysis results together with the rectangular coordinate data of the captured image data 200 in the storage unit 19 as data indicating the area.

Figure 6:
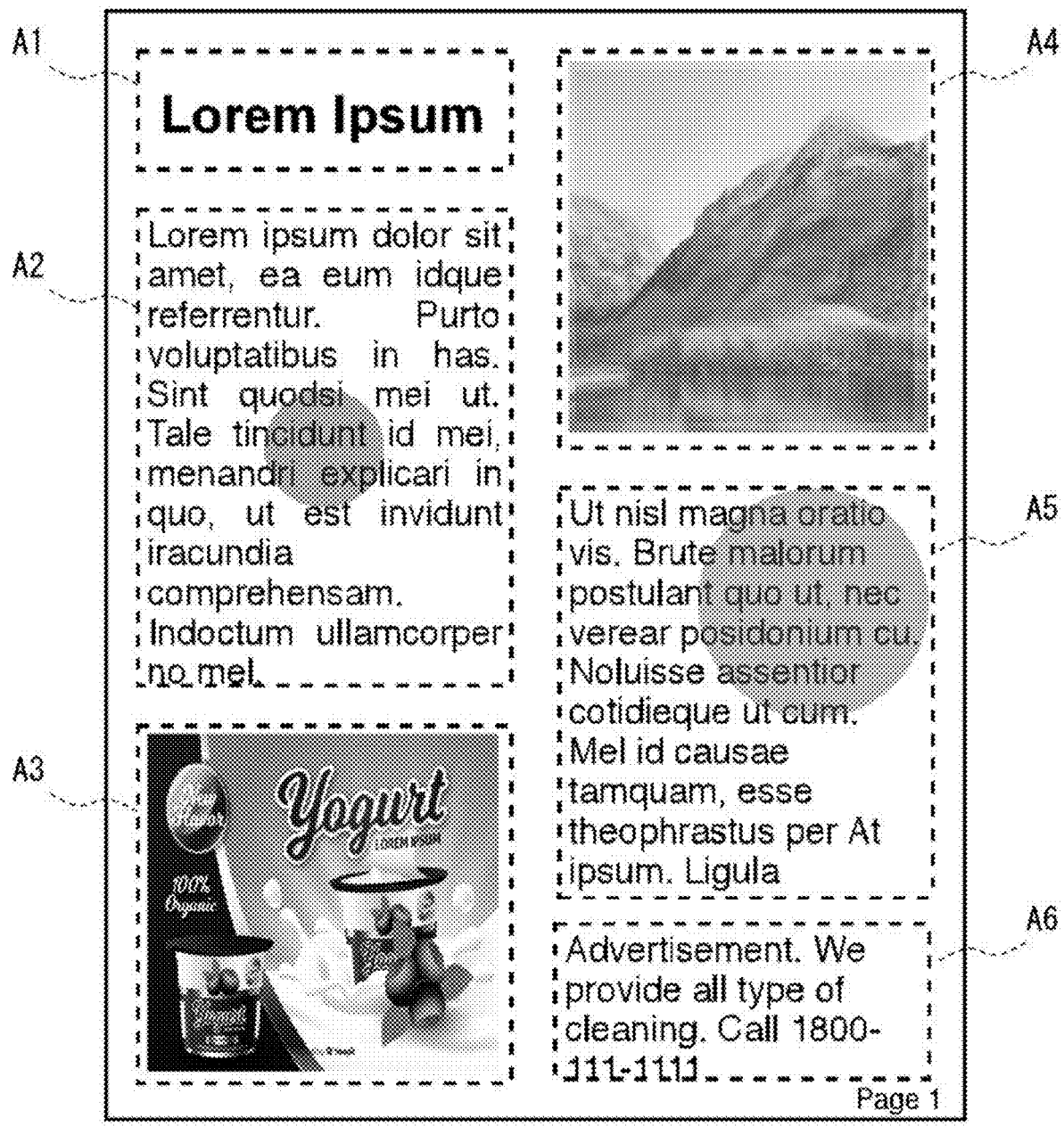
FIG. 6 is a conceptual diagram of the area classification processing as shown in FIG. 4.

FIG. 6 shows an example in which areas A1, A2, A3, A4, A5, and A6 are recognized from the captured image data 200 in FIG. 5. In this example, the areas A1, A2, A5, and A6 are recognized as texts, and the areas A3 and A4 are recognized as images.

(Step S102)

Next, the area selecting unit 110 determines whether or not each area includes a text.

In the present embodiment, the area selecting unit 110 determines Yes if the area is classified into either a text or a table. The area selecting unit 110 determines No if the area is classified as an image or otherwise.

In the case of Yes, the area selecting unit 110 proceeds with the process to step S102.

In the case of No, the area selecting unit 110 advances the processing to Step S105.

(Step S103)

If the area includes a text, the area selecting unit 110 determines need to scan or not.

If the accuracy of the classification is less than a specific threshold, the area selecting unit 110 determines that the classification has failed and thus determines Yes. Alternatively, based on the analysis result of the state of the area, if OCR is not possible, the area selecting unit 110 determines that the result is Yes because of necessity to obtain a clearer image. In addition, if the state of the area is unclear, the area selection unit 110 determines Yes.

On the other hand, the area selecting unit 110 determines No if the classification accuracy of the area of the captured image data 200 is higher than the specific threshold and the state of the area is suitable for OCR.

In the case of Yes, the area selecting unit 110 proceeds with the process to step S104.

In the case of No, the area selecting unit 110 advances the processing to Step S105. In this case, the area selecting unit 110 selects to output the captured image data 200.

(Step S104)

If scanning should be performed, the area selecting unit 110 and the document reading unit 12 perform a scanning process.

In this case, the area selecting unit 110 does not output the captured image data 200 and selects to use the scan image data 210. The area selecting unit 110 causes the document reading unit 12 to scan the location of the area and obtains the scanned image data 210.

More specifically, the area selecting unit 110 can cause the document feeding unit 13 to convey the document D, and causes the document reading unit 12 to scan only the portion corresponding to the rectangular coordinate data of the area of the captured image data 200. Alternatively, if it is necessary to scan a plurality of areas in one page of the document, the area selecting unit 110 may cause the document reading unit 12 to scan entire page of the document D, cuts out a portion corresponding to the area, and output it. At this time, the area selecting unit 110 can cause the area of the captured image data 200 to be scanned at a resolution higher than that of the captured image data 200 with a setting suitable for OCR, depending on whether the location of the area is color, partial color, or monochrome (black and white).

The area selecting unit 110 stores the scanned image data 210 in the storage unit 19 in association with the data indicating the area.

(Step S105)

Here, the image processing unit 11 performs a content recognition process.

When outputting the captured image data 200 with reference to the data indicating the area, the image processing unit 11 cuts out the portion of rectangular coordinate data of the area of the captured image data 200 and performs image recognition. On the other hand, when the scan image data 210 is used, image recognition is performed for a portion in this area.

When the area is classified as text, the image processing unit 11 recognizes, for example, the state of a column, a paragraph, and a line, and recognizes a character portion. When the area is a table, the image processing unit 11 recognizes, for example, a form and a character portion. Then, the image processing unit 11 performs OCR on the character portion.

In the case of an image, the image processing unit 11 recognizes non-text lines, symbols, illustrations, logos, photographs, and the like. The image processing unit 11 also recognizes the contents of these imaging objects.

Further, the image processing unit 11 can recognize an advertisement by combining various models.

(Step S106)

Next, the image processing unit 11 determines whether or not the content of the area is related to the other text.

If the OCR is possible, the image processing unit 11 analyzes the content of the recognized text by natural language processing and determines Yes if there is a relationship with another text (the other text) already recognized in another area. The determination of the content may be performed by, for example, analysis of the frequency of occurrence of the same word, syntax analysis, semantic analysis, or the like. Further, the image processing unit 11 infers that the part of the area composed of large characters and preceded to a group of characters, such as a paragraph, is a title related to another text, or the like, and determines that the result is Yes.

If the area is classified as an image and the recognition result of the image indicates that the area is not an advertisement, an illustration, a logo, or the like, the image processing unit 11 determines that there is a possibility that the area is related to another text, or the like, and determines Yes.

On the other hand, if it is not related to other texts, the image processing unit 11 determines No. Specifically, for example, if the image is determined to be an advertisement by a model that recognizes the advertisement, the image processing unit 11 determines No. Furthermore, the image processing unit 11 also determines No if the classification of the area is an image and the user has set that necessity of the image is "no image required," or the like.

In the case of Yes, the image processing unit 11 advances the processing to Step S107.

In the case of No, the image processing unit 11 proceeds with the process to step S108. As a result, the determined area is deleted without being output (deletion process).

(Step S107)

If it is related to another text, the image processing unit 11 performs an area processing and outputting process.

The image processing unit 11 obtains the location of the rectangular coordinate data of the captured image data 200 or the scanned image data 210 for each area, performs processing, and outputs it as area data 220.

Image processing unit 11, as the process, first, when the area is a monochrome or a part color, converts the image data to be included in the area data 220 to a monochrome or partial color. The same applies to a case where the user designates monochrome or partial color as the format of the document data 230. The image processing unit 11 converts text, images, and the like, described in a single color close to black to monochrome. As described above, when it is not necessary to perform full-color printing, conversion to monochrome or partial color printing can reduce the size of area data.

Further, when the area is classified as text, the image processing unit 11 outputs the area data 220 replaced with the OCR characters, and the image data can be deleted. Thereby, a stain and the like are also deleted. Alternatively, depending on the format of the document data 230, the image processing unit 11 may output the area data 220 including text data in the image data as "transparent text". In addition, in the case of setting to delete handwritten comments, figures, markers, and the like as the format of the document data 230, the image processing unit 11 may delete these. Furthermore, the image processing unit 11 may perform a check by using a spell checker to detect and correct an OCR character recognition error, an erroneous writing of the original document D, or the like.

If the area is classified as a table, the image processing unit 11 detects the location of the form. The image processing unit 11 converts this location of form into vector data, table structure data, or the like, and outputs the converted data as the area data 220 corresponding to the format of the document data 230. At this time, the image processing unit 11 includes the portion of the text recognized by the OCR within this form and outputs them. Furthermore, if processing that takes into account the semantics of the document is required, the image processing unit 11 performs processing that takes this into account. Specifically, when a process is required in consideration of the meaning of the text term arranged in the form, the image processing unit 11 performs a process according to the meaning. For example, when there is a "total (sum)" column, and when blanks or characters cannot be recognized, the image processing unit 11 may calculate this total and output it.

If the area is classified as an image, the image processing unit 11 performs processing on the position of the rectangular coordinate data of the captured image data 200 or the scan image data 210 for image processing such as rotation and distortion (skew) correction, density adjustment, gradation adjustment, image improvement, or the like. Specifically, after performing skew correction, the image processing unit 11 performs correction of brightness, hue, exposure, or the like, ground color removal, removal of stains, noise removal, and the like, and can optimize an image. Furthermore, an object similar to the recognized imaging object may be generated and replaced by an AI such as Generative Adversarial Network (GAN), or the like, to sharpen the image. The image processing unit 11 outputs the image data on which the image processing has been performed as the area data 220.

An example of the processing area output processing will be described with reference to FIGS. 6 and 7.

The area A1 is classified as text, is determined to be a title, and shows an example in which only text is output as the area data 220-1.

The area A2 is also classified as text, is determined to be related to another text (other text), and shows an example in which only text is output as the area data 220-2. Here, the stain and the like indicated by light-colored circles in FIG. 6 has been removed.

An area A3 shows an example that is recognized as an advertisement image and deleted, that means, it is not output as the area data 220.

An area A4 shows an example that is classified as an image, is subjected to image processing, and is output as area data 220-4.

An area A5 shows an example that, despite having classified as text, a stain, or the like, is large as shown by light-colored circle in FIG. 6, and thus the scan image data 210 is obtained. Also, in this example, the text is determined to be related to another text, only the text is output as the area data 220-5, and the stains, and the like, is thus removed.

An area A6 is classified as a text, is determined as an advertisement not related to another text, is deleted, and is not output as the area data 220.

(Step S108)

Here, it is determined whether the document output unit 120 has processed all the areas or not.

The document output unit 120 determines Yes if all the areas of the same page of the document D have been processed. In other cases, the document output unit 120 determines No.

In the case of Yes, the document output unit 120 advances the processing to Step S109.

In the case of No, the document output unit 120 returns the processing to step S101 and continues the processing of another area.

(Step S109)

When all the areas have been processed, the document output unit 120 performs a reconstruction process.

The document output unit 120 collects the area data 220 of the same page, reconstructs them into document data 230, and outputs it.

Figure 7:
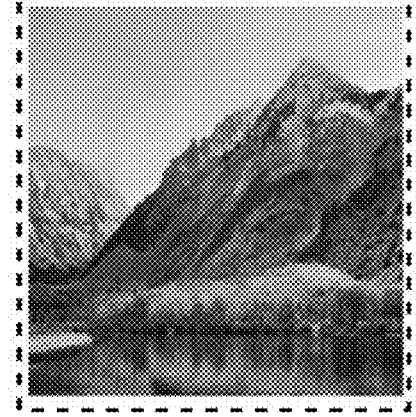
FIG. 7 is a diagram showing an example of the document data created by the reconstruction process as shown in FIG. 4.

In an example of the area data 220 as shown in FIG. 7, as described above, the area data 220-1, the area data 220-2, the area data 220-3, and the area data 220-4 are arranged on the same page as in the captured image data 200.

(Step S110)

Here, the document output unit 120 determines whether all pages have been output or not. The document output unit 120 determines Yes if the processing has been completed for all the pages. Otherwise, the document output unit 120 determines No.

In the case of Yes, the document output unit 120 ends the document reading process. At this time, the document output unit 120 may perform a process corresponding to the output instruction, such as transmitting the document to the location designated by the user, storing the document, recording on a recording sheet, or the like.

In the case of No, the document output unit 120 returns the process to step S100, and advances the imaging of the document D.

As described above, the document reading processing according to the embodiment of the present disclosure ends.

With the above configuration, the following effects can be retained.

In a typical technology, only to correct the brightness of the entire page by a documenting apparatus by using a camera is possible. For this reason, automatically improving the quality of the document in which texts and images are mixed in the same page has been quite difficult.

On the other hand, the image forming apparatus 1 according to the embodiment of the present disclosure is an image reading apparatus including: a camera 20 that captures a document in page units and acquires captured image data 200; an area classifying unit 100 that classifies the captured image data 200 captured by the camera 20 into areas for each content; an area selecting unit 110 that selects, for each area classified by the area classifying unit 100, whether or not to output the captured image data 200 based on area classification and state of the captured image data 200; a document reading unit 12 (image scanner) having a higher resolution than the camera 20 that scans the area of the document for the area selected not to output the captured image data 200 in the area selecting unit 110; an image processing unit 11 that processes, for each area, the captured image data 200 or scan image data 210 scanned by the document reading unit 12 and outputs the area as an area data 220 or deletes the area; and a document output unit 120 that collects the area data 220 processed by the image processing unit 11, reconstructs the data into document data 230, and outputs the document data 230.

With this configuration, to capture an image of a document by using the camera 20, analyze the document for each area, and scan and process the image with an image scanner is possible. As a result, this allows to scan only the necessary area with the image scanner while acquiring the captured image data 200 with the camera 20 at higher speed than the image scanner. That is, high-speed reading can be performed while ensuring the quality of the output document data 230. Further, by performing the processing or deleting based on the classification of the area, obtaining the optimal document data 230 can be performed.

In the image forming apparatus 1 according to the embodiment of the present disclosure, area classification by the area classifying unit includes a text, a table, and an image; and the image processing unit 11 processes the captured image data 200 or the scanned image data 210 of the area classified into the text or the table, and outputs area data 220 including character data and/or table data.

With such a configuration, various types of original document can be efficiently processed according to the analysis of the text, table, and image for each area, and optimal document data 230 can be obtained. Further, by performing the processing according to the classification of the area, the processing load can be reduced, and the calculation resources can be saved. In addition, by performing processing in accordance with a text, a table, and an image, providing document data 230 that is easy to read and has a reduced data amount is possible.

In the image forming apparatus 1 according to the embodiment of the present disclosure, the area selecting unit 110 does not output the captured image data 200 and scans with the document reading unit 12 when the area is classified as a text or a table and state of the captured image data 200 is not suitable for OCR.

With this configuration, even if OCR, or the like, does not work well with the resolution of the camera 20 or if imaging does not work due to external light, or the like, the scan image data 210 is acquired and various processes can be performed. For this reason, achieving both high-speed imaging with the camera 20 and scan quality with the image scanner is possible.

Further, in the image forming apparatus 1 according to the embodiment of the present disclosure, the image processing unit 11 recognizes and deletes an area that is not related to the content of another text (other text).

With such a configuration, unnecessary portions can be deleted from the document data 230, and the document data 230 that is easy to view can be provided. Further, the storage capacity of the document data 230 can be reduced.

Further, the image forming apparatus 1 according to the embodiment of the present disclosure is that an image not related to the content of the other text includes an advertisement, an illustration, and a logo.

With such a configuration, advertisements, and the like, can be efficiently removed.

Other Embodiments

In the above-described embodiment, an example has been described in which the scanned image data 210 read by the document reading unit 12 has higher quality than the captured image data 200 captured by the camera 20.

However, the quality of the captured image data 200 may be higher than that of the scanned image data 210.

In this case, the captured image data 200 may be used as the area data 220 instead of the scan image data 210. For example, when there is a streak due to dirt on the document reading slit 12c or the like, a rectangular coordinate portion of the captured image data 200 may be cut out.

With such a configuration, image data can be obtained in any case, and a flexible configuration can be supported.

In the above-described embodiment, an example has been described in which the locations of the rectangular coordinate data of the captured image data 200 are classified into a plurality of areas.

However, the number of areas may be one in one page. Further, the area may be a polygon, or the like, that is not a rectangle. Also, the area may be set within or with overlapped another rectangle, polygon, or the like, within the rectangle, the polygon, or the like.

In addition, the text, the table, and the image may be classified or selected as an area in a mixed state, respectively.

With this configuration, a flexible configuration can be accommodated.

In the above-described embodiment, it has been described that an area including text is scanned by the document reading unit 12 as necessary.

However, depending on the state of the captured image data 200 included in the area, the document may be scanned by the document reading unit 12 without including the text. Specifically, for example, when there is a poor external light state, a hand or the like is in the image, dirt on the lens of the camera 20, a fold or three-dimensional dirt on the document D, or the like, the document reading unit 12 may perform scanning.

With this configuration, when the quality of the captured image data 200 is low, the scanned image data 210 is acquired, and the high-quality document data 230 can be created.

In the above-described embodiment, an example has been described in which the image processing unit 11 performs various processes such as AI.

However, part or all of the processing of the image processing unit 11 described above may be executed by the control unit 10, an external client PC, another MFP, a server, or a service or server on a so-called "cloud."

With such a configuration, depending on processing, executing the processing more efficiently than the image processing unit 11 is possible.

In the above-described embodiment, an example has been described in which an area to be deleted is sequentially determined.

However, the area to be deleted may be determined after looking at the page or the entire document.

With this configuration, it is possible to reduce the possibility that the advertisement is not deleted or that the content of the document is erroneously deleted, and the document data 230 from which the advertisement is reliably removed can also be provided.

In the above-described embodiment, an example has been described in which the area data 220 is arranged in the same manner as a document.

However, in the document data 230, deleted areas may be packed and arranged.

With this configuration, it is possible to reduce the number of pages of the document data 230 by an amount corresponding to the reduction of the advertisement, and the like.

In the above-described embodiment, an example in which the camera 20 is provided in the image forming apparatus 1 has been described.

However, a configuration that a camera imaging type scanner including an imaging unit by using a camera, a USB camera, or the like, may be separately connected to the image forming apparatus 1 is possible. Alternatively, a configuration in which an apparatus including the document reading unit 12, the document feeding unit 13, and the camera 20 is connected to a printer may be employed. Further, a configuration in which a camera such as a user's mobile phone or smartphone is used as the camera 20 is also possible. In these cases, the captured image data 200 may collectively be transmitted to the image forming apparatus 1 beforehand, and then scanned by an image scanner such as the document reading unit 12 if necessary With such a configuration, the above-described processing can be executed even in an image forming apparatus that does not include the camera 20 in the apparatus.

Alternatively, the image reading apparatus of the present disclosure can be applied to an information processing apparatus other than the image forming apparatus 1. That is, a configuration by using a dedicated scanning apparatus such as a document camera, a network scanner, a server to which the scanner is separately connected by USB, or the like, may be used.

Further, the configuration and operation of the above-described embodiment are examples, and it is needless to say that the configuration and operation can be appropriately changed and executed without departing from the aim of the present disclosure.

What is claimed is:

1. An image reading apparatus comprising:
a camera, an image scanner, a document feeder, an image processing unit, a controller and a non-temporary recording medium;
wherein
a control program is stored on the non-temporary recording medium;
the controller is configured to execute the control program to operate as an area classifying unit, an area selecting unit, and a document output unit;
the camera is configured to capture a document in page units and acquire captured image data;
the area classifying unit is configured to classify the captured image data captured by the camera into respective areas for each content and store corresponding rectangular coordinate data of the respective areas;
the area selecting unit is configured to select, for each area classified by the area classifying unit, whether or not to output a corresponding portion of the captured image data based on classification and state of the portion of the captured image data, thereby selecting to output a portion of the captured image data corresponding to one or more areas and selecting not to output a portion of the captured image data corresponding to one or more areas;
the image scanner is configured to have a higher resolution than the captured image data and to 1) scan, with the higher resolution, a portion of the document corresponding to the rectangular coordinate data of the one or more areas of the document for which the area selecting unit selected not to output the corresponding portion of the captured image data, thereby providing scanned image data; and 2) not scan a portion of the document corresponding to the rectangular coordinate data of the one or more areas of the document for which the area selecting unit selected to output the corresponding portion of the captured image data;
the image processing unit configured is to process, for each area, the corresponding portion of the captured image data selected for output or the scanned image data scanned by the image scanner and output the area as an area data or delete the area;
the document output unit is configured to collect the area data processed by the image processing unit, reconstruct the area data for each of the areas into document data, and output the document data;
the document feeder is configured to feed the document to the image scanner; and
the camera is arranged such that the capture of the document is obtained from the document when the document is on the document feeder.

2. The image reading apparatus according to claim 1, wherein:

classification classified by the area classifying unit includes a text, a table, and an image; and the image processing unit processes the captured image data or the scanned image data of the area classified into the text or the table, and outputs the area data including character data and/or table data.

3. The image reading apparatus according to claim 2, wherein:

the image processing unit recognizes and deletes the area that is not related to the content of other text.

4. The image reading apparatus according to claim 3, wherein:

an image not related to the content of the other text includes an advertisement, an illustration, and a logo.

5. The image reading apparatus according to claim 1, wherein:

the area selecting unit does not output the captured image data and scans with the image scanner when the area is classified as a text or a table and state of the captured image data is not suitable for optical character recognition.

6. An image forming apparatus comprising:

a camera, an image scanner, a document feeder, an image processing unit, an image forming unit, a controller and a non-temporary recording medium;

wherein a control program is stored on the non-temporary recording medium;

the controller is configured to execute the control program to operate as an area classifying unit, an area selecting unit, and a document output unit;

the camera is configured to capture a document in page units and acquire captured image data;

the area classifying unit is configured to classify the captured image data captured by the camera into respective areas;

the area selecting unit is configured to select, for each area of the captured image data classified by the area classifying unit, whether or not to output a corresponding portion of the captured image data based on classification and state of the portion of the captured image data, thereby selecting to output a portion of the captured image data corresponding to one or more areas and selecting not to output a portion of the captured image data corresponding to one or more areas;

the image scanner is configured to have a higher resolution than the captured image data and to 1) scan, with the higher resolution, a portion of the document corresponding to rectangular coordinate data of the one or more areas of the document for which the area selecting unit selected not to output the corresponding portion of the captured image data, thereby providing canned image data; and 2) not scan a portion of the document corresponding to the rectangular coordinate data of the one or more areas of the document for which the area selecting unit selected to output the corresponding portion of the captured image data;

the image scanner is configured to have a higher resolution than the captured image data and to 1) scan, with the higher resolution, a portion of the document corresponding to the rectangular coordinate data of the one or more areas of the document for which the area selecting unit selected not to output the corresponding portion of the captured image data; and 2) not scan a portion of the document corresponding to the rectangular coordinate data of the one or more areas of the document for which the area selecting unit selected to output the corresponding portion of the captured image data;

the image processing unit configured is to process, for each area, the corresponding portion of the captured image data selected for output or the scanned image data scanned by the image scanner and output the area as an area data or delete the area;

the document output unit is configured to collect the area data processed by the image processing unit, reconstruct the area data for each of the areas into document data, and output the document data;

the image forming unit is configured to form an image of the document data output by the document output unit;

the document feeder is configured to feed the document to the image scanner; and the camera is arranged such that the capture of the document is obtained from the document when the document is on the document feeder.

7. The image forming apparatus according to claim 6, wherein:

classification classified by the area classifying unit includes a text, a table, and an image; and the image processing unit processes the captured image data or the scanned image data of the area classified into the text or the table, and outputs the area data including character data and/or table data.

8. The image forming apparatus according to claim 7, wherein:

the image processing unit recognizes and deletes the area that is not related to the content of other text.

9. The image forming apparatus according to claim 8, wherein:

an image not related to the content of the other text includes an advertisement, an illustration, and a logo.

10. The image forming apparatus according to claim 6, wherein:

the area selecting unit does not output the captured image data and scans with the image scanner when the area is classified as a text or a table and state of the captured image data is not suitable for optical character recognition.

11. An image reading method executed by an image reading apparatus, comprising the steps of:

with a camera, capturing a document in page units and acquiring captured image data, wherein the capturing is performed when the document is on a document feeder that feeds the document to an image scanner;

classifying the captured image data that is captured into respective areas for each content and storing corresponding rectangular coordinate data of the respective areas;

selecting, for each classified area, whether or not to output a corresponding portion of the captured image data based on classification and state of the portion of the captured image data, thereby selecting to output a portion of the captured image data corresponding to one or more areas and selecting not to output a portion of the captured image data corresponding to of one or more areas;

with an image scanner, 1) scanning, with a higher resolution than the captured image data, a portion of the document corresponding to the rectangular coordinate data of the one more areas of the document for which the corresponding portion of the captured image data was selected not to output, thereby providing scanned image data; and 2) not scanning a portion of the document corresponding to the rectangular coordinate data of the one or more areas of the document for which the corresponding portion of the captured image data was selected to output;

processing, for each area, the corresponding portion of the captured image data selected for output or the scanned image data scanned by the image scanner and outputting the area as an area data or deletes the area; and collecting processed area data, reconstructing the area data for each of the areas into document data, and outputting the document data.

12. The image reading method according to claim 11, wherein:

classification includes a text, a table, and an image; and the method further includes processing the captured image data or the scanned image data of the area classified into the text or the table, and outputting the area data including character data and/or table data.

13. The image reading method according to claim 12, further comprising recognizing and deleting the area that is not related to the content of other text.

14. The image reading method according to claim 13, wherein:

an image not related to the content of the other text includes an advertisement, an illustration, and a logo.

15. The image reading method according to claim 11, further comprising:

not outputting the captured image data and scanning with the image scanner when the area is classified as a text or a table and state of the captured image data is not suitable for optical character recognition.

* * * * *